United States Patent [19]
Kameda et al.

[11] Patent Number: 4,854,413
[45] Date of Patent: Aug. 8, 1989

[54] TRANSFER CASE SHIFTING APPARATUS FOR PART-TIME FOUR-WHEEL DRIVE VEHICLE

[75] Inventors: Osamu Kameda; Shigeo Tabata, both of Hiroshima, Japan

[73] Assignee: Mazda Motor Corporation, Hiroshima, Japan

[21] Appl. No.: 186,995

[22] Filed: Apr. 27, 1988

[30] Foreign Application Priority Data

Apr. 27, 1987 [JP] Japan .................. 62-103653

[51] Int. Cl.$^4$ ............................................. B60K 17/34
[52] U.S. Cl. ...................... 180/247; 180/248; 74/665 GE
[58] Field of Search .............. 180/247, 248, 249, 250, 180/197, 333, 336; 74/665 GA, 665 GE, 705, 674, 740

[56] References Cited

U.S. PATENT DOCUMENTS 4,562,541 12/1985 Sakakiyama .................. 180/197
4,644,822 2/1987 Batchelor .................. 180/250

Primary Examiner—Charles A. Marmor
Assistant Examiner—Donn McGiehan
Attorney, Agent, or Firm—Fleit, Jacobson, Cohn, Price, Holman & Stern

[57] ABSTRACT

A transfer case operating apparatus for shifting a part-time four-wheel transfer case of a vehicle having a transfer gear assembly and a center-differential gear assembly, with their associated gear shift devices. The operating apparatus comprises a power drive actuator coupled to one of the shift devices; a mechanical actuator directly coupled to the other; a shift control device operated by a driver in the driver's compartment of the vehicle shift the transfer case between at least two-wheel high-speed drive mode; four-wheel, differential-free drive mode; and four wheel, differential-locked, low-speed drive mode; and a mechanism for, when the shift control device is operated to shift one gear assembly associated to the power drive actuator, disconnecting the mechanical actuator from the shift control device so as not to shift the other gear assembly. The mechanism works with different operating forces for causing the power drive and mechanical actuators.

14 Claims, 10 Drawing Sheets

FIG. 3A  POSITION $P_H$
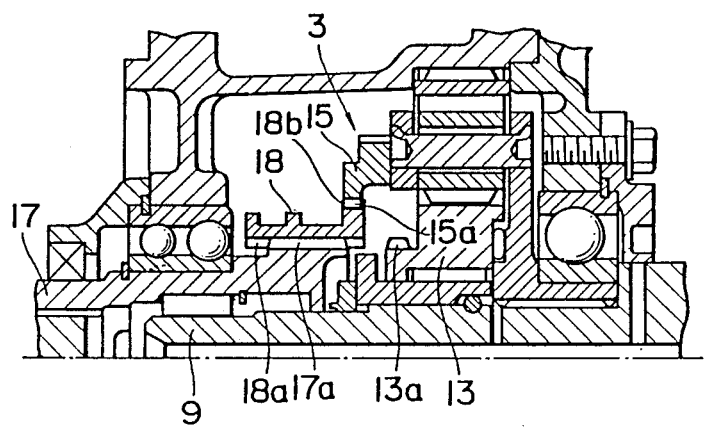
FIG. 3B  POSITION $P_L$
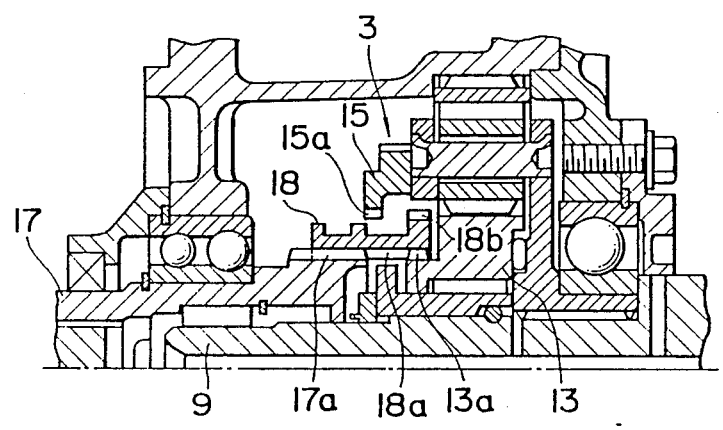
FIG. 3C  POSITION N
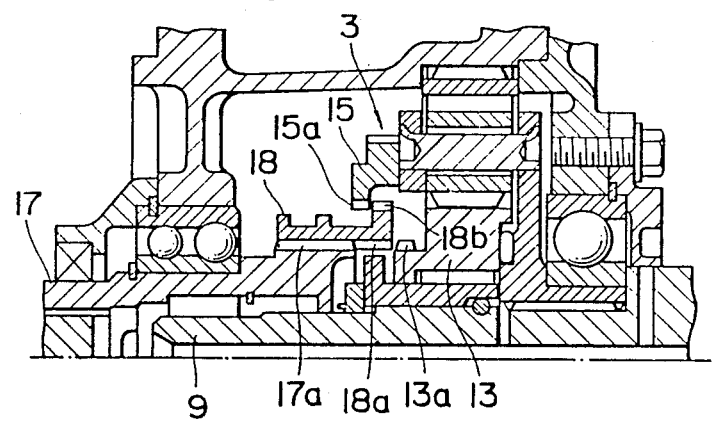

FIG. 3D  POSITION P4F
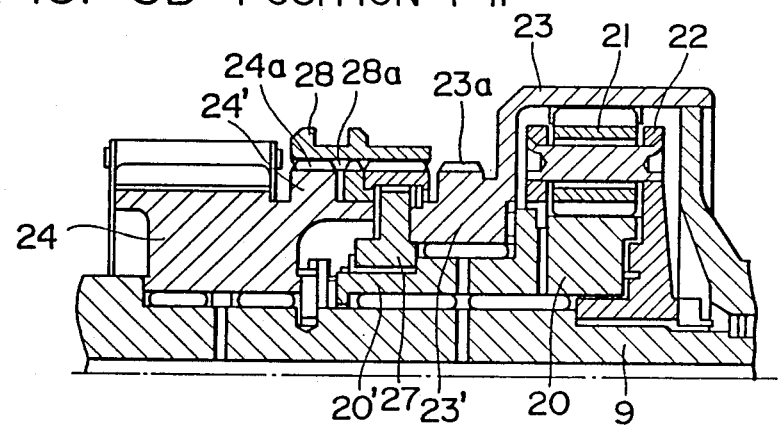
FIG. 3E  POSITION P4L
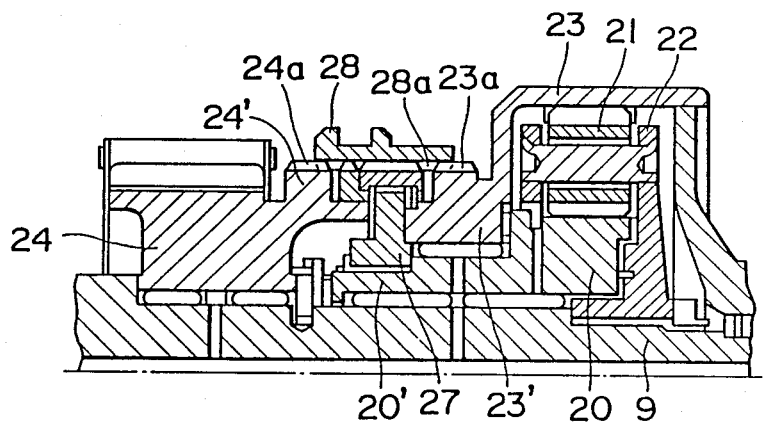
FIG. 3F  POSITION P2
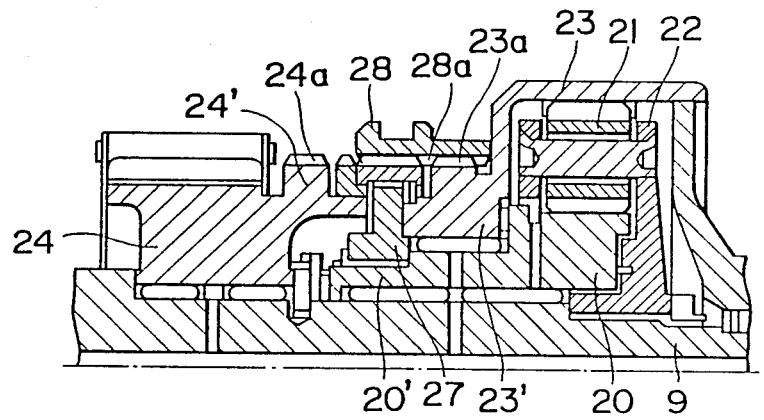

TRANSFER CASE SHIFTING APPARATUS FOR PART-TIME FOUR-WHEEL DRIVE VEHICLE

FIELD OF THE INVENTION

The present invention relates to a transfer case shifting apparatus for use in a vehicle equipped with part-time four-wheel drive.

BACKGROUND OF THE INVENTION

Transfer cases used on vehicles equipped with four-wheel drive generally include; transfer gear shift means for shifting a transfer gear assembly between a high and a low speed drive range so as to transmit driving power with or without torque multiplication from an engine to wheels; center-differential gear shift means for shifting a center-differential gear assembly between a differential-locked and a differential-free drive mode; and, if used on vehicles equipped with part- time four-wheel drive, means for shifting the center-differential gear assembly between a four-wheel and a two-wheel drive mode. In any case, these shift means are needed to be operated within the driver's compartment to selectively shift the transfer case to a desired drive mode of operation.

One such transfer case is disclosed in, for example, Japanese Utility Model Publication No. 61-9791 entitled "2-4 Drive Mode Shifting Mechanism for a Four Wheel Drive Vehicle", published Mar. 28, 1986. The transfer case taught in the above mentioned Japanese Utility Model Publication has a hydraulic actuator for causing means which selectively shifts a center-differential gear assembly between a two-wheel and a four-wheel drive mode and a solenoid valve by which the hydraulic actuator is controlled in operation. The solenoid is electrically controlled to cause the hydraulic actuator so as to shift the center-differential into the two-wheel drive mode when the vehicle is traveling at a high speed. On the other hand, when the vehicle is traveling at a low speed, the center-differential is shifted into the four-wheel drive mode when a transfer is in a low gear or is selectively shifted to a desired drive mode between the two-wheel and four-wheel drive modes by manually operating a drive mode selecting switch operated by the driver.

Meanwhile, vehicles with electric shifting means for shifting transfer between a high and a low speed drive range are needed to be equipped with a synchromesh mechanism. Once a vehicle is in motion, the drive line will turn the output shaft continuously. As a result, a sliding gear will be whirling. When an attempt is made to mesh it with any of the cluster gears, the gear teeth will be subjected to damaging impact force. For one gear to mesh with another quietly and without damage, most gears must be rotating at nearly the same speed. For this reason, most transfers are equipped with a so called synchromesh mechanism.

Most synchromesh mechanisms practically equipped on the four-wheel drive vehicles are, however, hard to synchronize one gear to another with certainty in order to shift the transfer between a low and a high speed drive range while the vehicle is traveling. For an infallible shifting of transfer, there is proposed a transfer equipped with no synchromesh mechanism. Such a transfer is shifted between high and low speed drive modes by shift means actuated by an electric actuator. For effecting the shifting of the transfer, the vehicle is stopped and an engine clutch is disengaged to disconnect driving power from the engine to wheels.

It is a confusing operation to use such a switch for causing the actuator to change driving speed ranges which is to be operated by stepping a clutch pedal. The driver has a feeling of incompatibility with such a pedal and switch operation for changing drive modes. Furthermore, a problem in association with the transfer case without synchromesh mechanism is that a large force is needed to mesh one gear to another due to no rotation of gears.

The above mentioned confusing operation can be avoided by using mechanical shift means operated by shift levers one individual to each of a transfer and a differential. Such a mechanical shift means, because an operating force is generally different between transfer shifting and differential shifting operations, gives the driver a troublesome shift operation and an unfavorable operational feeling.

The above problems may be possibly avoided by use of motor driven shift means actuated through switches to shift both the transfer and differential. However, not only because of a large force generally needed for shifting the transfer which needs an expensive high power electric motor but because the provision of two motors is costly.

OBJECT OF THE INVENTION

It is, therefore, an object of the present invention to provide a transfer case shifting apparatus which gives drivers an agreeable feeling of operation.

It is another object of the present invention to provide a transfer case shifting apparatus by which a transfer case is shifted between various drive modes with certainty.

SUMMARY OF THE INVENTION

The above and other objects of the present invention are accomplished by providing a part-time four-wheel transfer case for a vehicle which comprises a transfer shiftable between a high and a low speed drive range and a center-differential shiftable at least between a two-wheel and a four-wheel drive mode, either one of which is shifted by manually operated shift means and the other by a motor driven shift means. Both the shift means are cooperated with a manual operating means operated by the driver in a driver's compartment of the vehicle. The manual operating means is formed as a lever member such as a column shift lever and is placed in various drive mode selecting positions.

According to a preferred embodiment of the present invention, the manual operating shift lever has at least four drive mode selecting positions, namely two-wheel high-speed range drive mode selecting position, four-wheel differential-free high-speed range drive mode selecting position, four-wheel differential-locked high-speed range drive mode selecting position and four-wheel differential-locked low-speed range drive mode selecting position. When the manual operating shift lever is operated to select two-wheel or four-wheel drive modes of operation of the transfer case in the high-speed range drive mode, the manual operating shift lever causes shift control means, although which is directly cooperated with transfer shift means, to actuate only a motor driven differential shift means so as to shift the center-differential between the two-wheel, four-wheel differential-free and four-wheel differential-locked drive modes while maintaining the transfer in the high-speed drive mode. On the other hand, when the manual operating shift lever is operated to select a low-speed range drive mode, the manual operating shift lever causes the shift control means directly to cause the transfer shift means without causing the motor driven differential shift means so as to shift the transfer between the four-wheel differential locked high-speed drive mode of operation and the four-wheel differential-locked low-speed range drive mode of operation.

According to another preferred embodiment of the present invention, the manual operating shift lever has three drive mode selecting positions, namely two-wheel high-speed range, four-wheel differential-locked high-speed range and four-wheel differential-locked low-speed range drive modes of operation. For shifting the center-differential between the two-wheel and four-wheel drive modes in this embodiment, the manual operating shift lever is provided switching means which is electrically enabled when the manual operating shift lever is placed in the two-wheel drive mode selecting position.

BRIEF DESCRIPTION OF THE DRAWINGS

The above and other object and features of the present invention will be apparent from a detailed description made by way of examples with reference to the accompanying drawings, in which:

FIGS. 3A to 3C are sectional views showing details of transfer gear shift means of the transfer gear assembly of the transfer case of FIG. 2 in various drive modes of operations;

FIGS. 3D to 3F are sectional views showing details of the differential gear shift means of the center-differential gear assembly of the transfer case of FIG. 2 in various drive modes of operations;

DETAILED DESCRIPTION OF THE INVENTION

A transfer case according to a preferred embodiment of the present invention incorporates various elements, in particular an engine, a transmission, front and rear axle assemblies and so forth, similar to those of conventional power trains. Because such elements are well known to those skilled in the art, this description will be directed in particular to elements forming part of, or cooperating directly with, the transfer case embodying the present invention. It is to be understood that transfer case elements not specifically shown or described herein may be selected from those known in the art.

Figure 1:
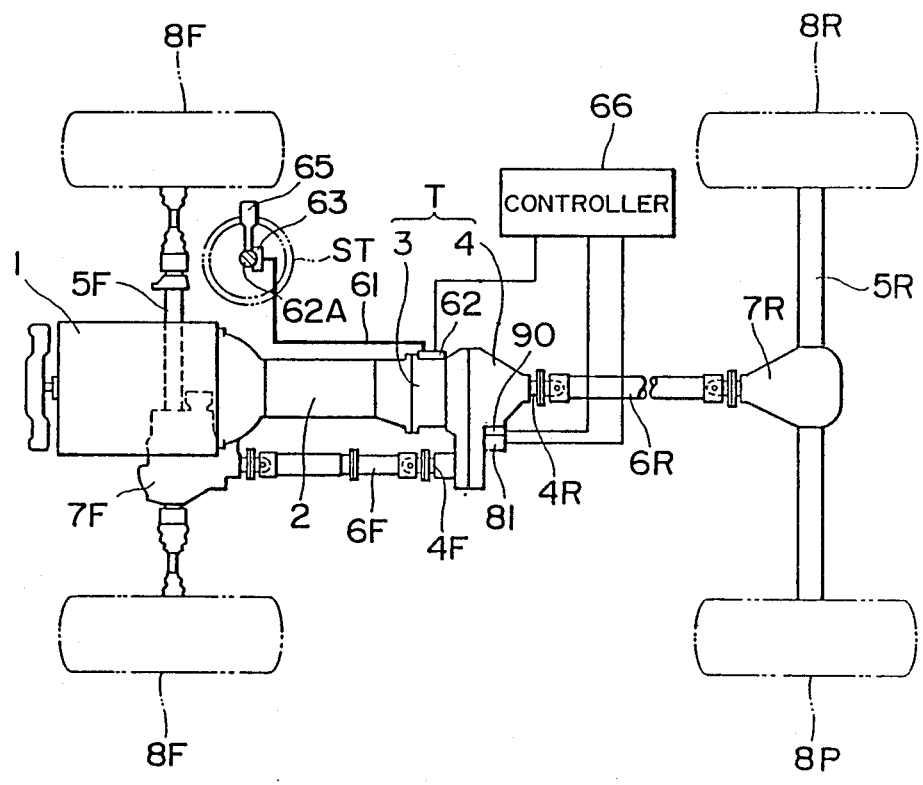
FIG. 1 is a schematic plan view illustrating a power train for a four-wheel drive vehicle embodying the present invention.

Referring now to the drawings, wherein like reference characters designate corresponding or similar parts or elements throughout the several views, there is generally schematically shown in FIG. 1 a vehicle equipped with part-time four-wheel drive which has an engine unit 1, a manual transmission case 2 connected to the engine unit 1 through an engine clutch (not shown), a transfer case T comprising a transfer gear assembly 3 and a center-differential gear assembly 4 arranged in order from the front side of the vehicle. A rear wheel drive shaft or rear output shaft 4R of the transfer case T is coupled to a rear axle shaft 5R through a rear propeller shaft 6R and a rear axle differential gear assembly 7R by which a pair of rear wheels 8R are turned differentially. A front wheel drive shaft or front output shaft 4F of the transfer case T, which is laterally spaced from and located in parallel with the rear output shaft 4R, is coupled to a front axle shaft 5F through a front propeller shaft 6F and a front axle differential gear assembly 7F by which a pair of front wheels 8F are turn differentially. As is generally well known to those skilled in the art, each propeller shaft 6R, 6F is coupled at its both ends to the output shaft 4R, 4F and the axle differential gear cases 7R, 7F by means of universal joints. The front axle shaft 5F is equipped with a free-wheeling mechanism (not shown) which, when the center-differential gear assembly 4 is in two-wheel drive mode (which is hereinafter noted by a 2 W drive mode on descriptive listings), disconnects the transmission of power between the transfer case T and the front axle shaft 6F to prevent the transfer case T from being affected by the motion of the front wheels 8F.

Figure 2:
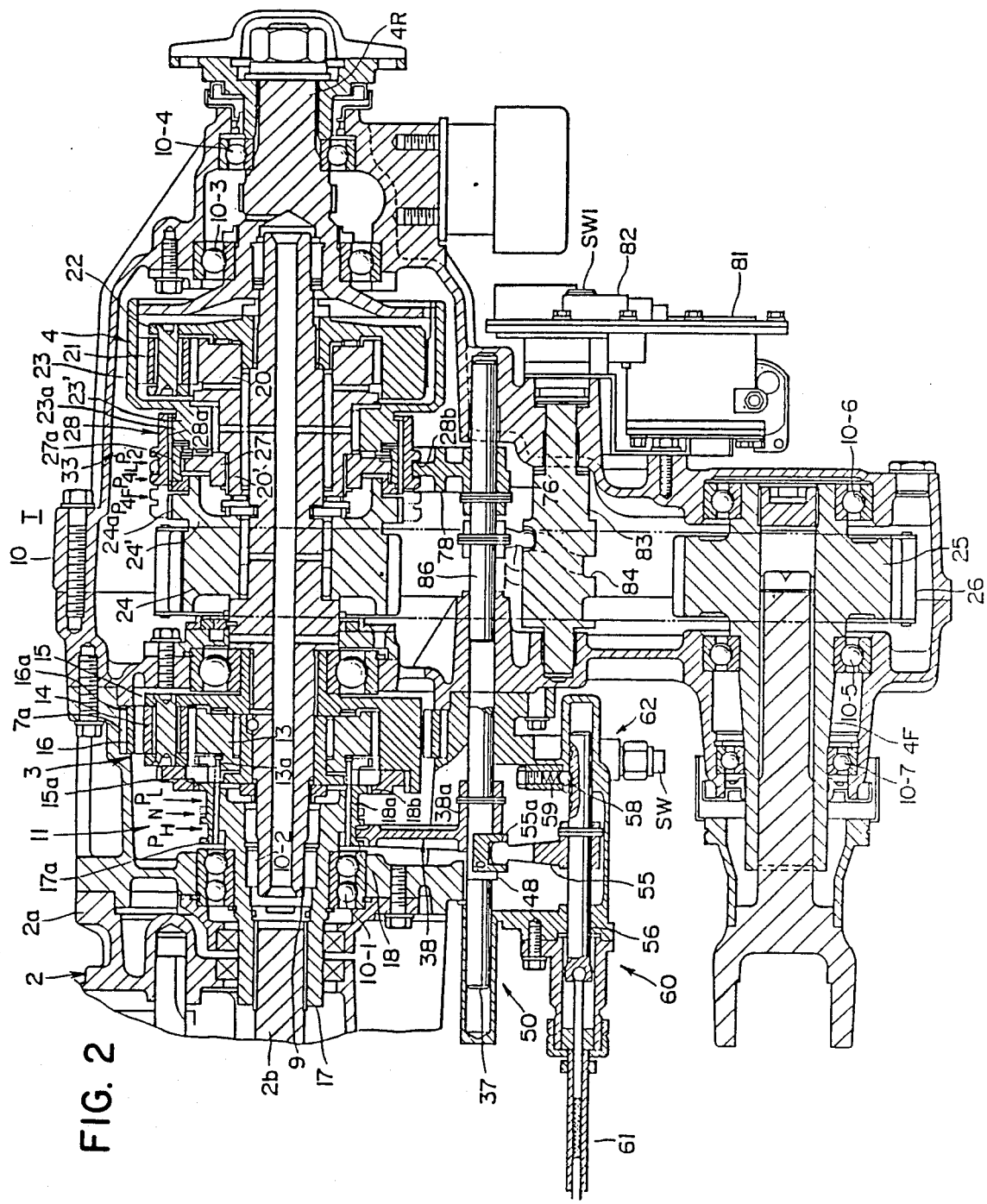
FIG. 2 is a schematic sectional view showing details of the transfer case of a vehicle equipped with four-wheel drive of this invention which is in the two-wheel, high-speed driving mode of operation.

Referring now to FIG. 2 shown therein in longitudinal section is the transfer case T comprising the transfer gear assembly 3 and the center-differential gear assembly 4, each of which basically comprises a planetary gear assembly. As shown, the transfer case T has a transfer case housing 10 connected to a transmission case housing 2a of the transmission case 2. The transfer case T has three rotatable shafts, namely a transfer input shaft 9 located coaxially relative to an output shaft 2b of the transmission case 2 held in the transfer case housing 10 for rotation; the rear output shaft 4R located coaxially relative to the transfer input shaft 9 and held by ball bearings 10-3 and 10-4 in the transfer case housing 10 for rotation; and the front output shaft 4F laterally spaced from and located in parallel with both the transfer input shaft 9 and the rear output shaft 4R and held by ball bearings 10-5, 10-6 and 10-7 in the transfer case housing 10 for rotation. The transfer gear assembly 3 and the center-differential gear assembly 4 which will be described in detail later are mounted on the transfer input shaft 9. Arranged coaxially with the transfer gear and the center-differential gear assemblies 3 and 4 are two shift mechanisms; namely a transfer gear shift means 11 in cooperation with the transfer gear assembly 3 disposed on the front or left side of the transfer gear assembly 3 and a differential gear shift means 33 in cooperation with the center-differential gear assembly 4 on the front or left side of the center-differential gear assembly 4.

The transfer gear assembly 3 which is selectively shiftable into a desired drive range, namely a low speed drive range or a high speed drive range (which are hereinafter noted by L or H drive mode on descriptive listings), to transmit driving power with or without torque multiplication from the transmission case 2 to the center-differential gear 4, consists of a planetary gear assembly. This planetary gear assembly has a sun gear 13 mounted on the transfer input shaft 9 for rotation; a plurality of pinion gears 14 in mesh with the sun gear 13 and supported by a carrier member 15 spline-coupled to the transfer input shaft 9; and a ring gear 16 in mesh with the pinion gears 14. The ring gear 16 is provided with external threads 16a which are in mesh with internal threads 7a formed on inner surface of the transfer case housing 10 so as to be fixedly held in the transfer case housing 7.

The sun gear 13 is formed with external splines 13a on its front outer periphery and the carrier 15 has an internal splines 15a formed on its front inner surface. A sleeve shaft 17 spline-coupled to the output shaft 2b of the transmission case 2 is supported by the transfer housing 10 through ball bearing 10-1 for rotation and rotatably receives therein the front end of the transfer input shaft 9 through a needle bearing 10-2. The sleeve shaft 17 is formed on its rear peripheral surface with external splines 17a coaxial with the splines 13a of the sun gear 13. Spline-coupled to the sleeve shaft 17 is a shift member 18 in the form of a sleeve which is formed with internal splines 18a engageable with the splines 13a of the sun gear 13 and with external splines 18b engageable with internal splines 15a of the carrier member 15. The shift sleeve member 18 is axially displaced along the splines 17a of the sleeve shaft 17 to shift the transfer gear assembly 3 to a desired speed range; H or L drive mode. When the shift sleeve member 18 is placed at a high speed range selecting position ($P_H$) as is shown in FIG. 2 and in more detail in FIG. 3A, the shift sleeve member 18 is brought into mesh with the carrier member 15, coupling the output shaft 2b of the transmission case 2 to the input shaft 9 of the transfer gear assembly 3 to directly transmit driving power therebetween without torque multiplication or gear ratio reduction. On the other hand, when the shift sleeve member 18 is placed at a low speed range selecting position ($P_L$) as is shown by a phantom line in FIG. 1 and in more detail in FIG. 3B, the shift sleeve member 18 is disengaged with the carrier member 15 and is brought into mesh with the sun gear 13 through the spline 13a, coupling the output shaft 2b of the transmission case 2 to the input shaft 9 of the transfer gear assembly 3 through the sun gear 13, the pinion gears 14 and the carrier member 15 so as to transmit driving power therebetween with torque multiplication or gear ratio reduction. The shift sleeve member 18 can be placed in a neutral position (N) between the positions $P_H$ and $P_L$ as is shown in FIG. 3C to maintain the transfer gear assembly 3 in a neutral condition.

Coaxially with and spaced apart from the transfer gear assembly 3, there is a center-differential gear assembly 4 mounted on the transfer input shaft 9 of the transfer case T. This center-differential gear assembly 4 comprises a planetary gear assembly having a sun gear 20 mounted on the transfer input shaft 9 for rotation, a carrier member 22 which is spline-coupled to the transfer input shaft 9 and carries a plurality of pinion gears 21, and a ring gear 23 fixedly coupled to the rear output shaft 4R.

Rotatably mounted on the transfer input shaft 9 between the transfer gear assembly 3 and the center-differential gear assembly 4 is a driving sprocket wheel 24 which is connected to a driven sprocket wheel 25 formed integrally with the front output shaft 4F by means of a driving chain 26 (shown by a dotted line in FIG. 2). Through these driving and driven sprocket wheels 24 and 25, driving power is transmitted from the transfer input shaft 9 of the transfer case T to the front output shaft 4F.

The sun gear 20 and the ring gear 23 of the planetary gear assembly of the center-differential gear assembly 4 have front extensions 20' and 23' formed integrally therewith, respectively. Spline-coupled to the front extension 20' of the sun gear 20 is a clutch hub 27 formed with external splines 27a. On the other hand, rotatably mounted on the front extension 20' of the sun gear 20 is the front extension 23' of the ring gear 23 which is formed with external splines 23a coaxial with the splines 27a of the clutch hub 27. The driving sprocket wheel 24 has a rear extension 24' having external splines 24a coaxial with the external splines 27a of the clutch hub 27. Slidably spline-coupled to these external splines 23a, 24a and 27a of the driving sprocket wheel 24 and the clutch hub 27 is a shift member 28 in the form of a sleeve through its internal spline 28a. By these elements, namely the shift sleeve member 28, the rear extension 24' of the driving sprocket wheel 24, the clutch hub 27 and the front extension 23' of the ring gear 23, center-differential gear shift means 33 is formed.

The shift sleeve member 28 can be selectively placed in three positions to shift the center-differential gear assembly 4 between a 4-wheel differential-free drive mode, a 4-wheel differential-locked drive mode and a 2-wheel drive mode (which are hereinafter noted by 4W-DF, 4W-DL and 2W drive modes, respectively on descriptive listings). More specifically, when the shift sleeve member 28 is placed in a position P4F shown by a phantom line in FIG. 2 and in more detail in FIG. 3D to select the 4W-DF drive mode, the shift sleeve member 28 couples or lock together the clutch hub 27 and the driving sprocket wheel 24 through their splines 24a, 27a and 28a and, simultaneously, uncouples the sun gear 20 and the ring gear 23 of the planetary gear assembly of the center-differential gear assembly 4, thereby to shift the center-differential gear assembly 4 into the 4W-DF drive mode. When the shift sleeve member 28 is placed in a position $P_{4L}$ shown by a solid line in FIG. 2 and in more detail in FIG. 3E to select the 4W-DL drive mode, the shift sleeve member 28 couples the driving sprocket wheel 24 and the clutch hub 27 as well as the sun gear 20 and the ring gear 23 of the planetary gear assembly of the center-differential gear assembly 4 all together, thereby to shift the center-differential gear assembly 4 into the 4W-DL drive mode. Finally, when the shift sleeve member 28 is placed in a position $P_2$ shown by a phantom line in FIG. 2 and in more detail in FIG. 3F to select the 2W drive mode, the shift sleeve member 28 couples the sun gear 20 and the ring gear 23 of the planetary gear assembly of the center-differential gear assembly 4, simultaneously with uncoupling the clutch hub 27 from the driving chain sprocket wheel 24, thereby to shift the center-differential gear assembly 4 into the 2W drive mode.

Arranged in juxtaposition with the transfer input shaft 9 of the transfer case T is a skid shift means 50 for causing mechanically the transfer gear shift means 11 to selectively shift the transfer gear assembly 3 between two different drive ranges, namely, the low speed drive range (L drive mode) and the high speed drive range (H drive mode) and for electrically actuating differential gear shift means 33 to selectively shift the center-differential gear assembly 4 between the 2W and 4W drive modes and/or the DF and DL drive modes. As is shown in detail in FIG. 4, the skid shift means 50 includes a shift rod 37 spaced laterally from and in parallel with the input shaft 9 of the transfer case T which is slidably supported by the transfer case housing 10 for axial movement but prevented from rotation. The shift rod 37 is selectively placed in four different drive mode selecting positions and neutral mode selecting position corresponding to the four drive modes into which the transfer case T is shiftable, namely, 2W-H (2-wheel, high-speed range) drive mode, 4 W - DF-H (4-wheel, differential-free, high-speed range) drive mode, 4W-DL-H (4-wheel differential-locked, high-speed range) drive mode and 4W-DL-L (4-wheel differential-locked, low-speed range) drive mode, in order from the front or the left as viewed in FIG. 4 and a neutral mode between the 4W-DL-H and 4W-DL-L drive modes. Slidably mounted on the shift rod 37 is a boss 38a of a shift fork 38 slidably received by an annular groove 18c of the shift sleeve member 18 of the transfer gear shift means 11. Formed underside the boss 38a of the shift fork 38 is formed with a surface 38b slidably contacted to an inner surface of a guide plate 44 bolted at points 43 to the transfer case housing 7. The boss 38a of the shift fork 38 is further formed with a radial through hole 40 in which a pin 41 is slidably received. The inner end of the pin 41 is slidably received within an axial groove 37a formed in the outer periphery of the shift rod 37. Although the groove 37a has its axial length necessary to receive the pin 41 therein, it is advantageous to form a relatively long axial groove 37a in order to relieve air or oil therefrom. There is formed in the transfer case housing 10 a blind bore 45 in which disposed are a steel ball 46 and a spring 47 for forcing the steel ball 46 against the outer end of the pin 41 so as to maintain the inner end of the pin 41 received within the axial groove 37a of the shift rod 37 or slidably contacting the outer periphery of the shift rod 37.

Fastened by a knock pin 49 to the shift rod 37 is an annular connecting ring 48 disposed on the front side of the boss 38a of the shift fork 38. There is a restriction stud 51 projecting from the transfer case housing 10 or the guide plate 44 which is abutted by the boss 38a of the shift fork 38 when the shift rod 37 is axially displaced beyond the 4W-DL-H drive mode selecting position from the right to the left as viewed in FIG. 4, so as to restrict the boss 38a of the shift fork 38 to axially slide to the left while allowing the shift rod 37 to be displaced further to the left. When the boss 38a of the shift fork 38 is restricted by the restriction stud 51, the shift fork 38 is so positioned as to place the shift sleeve member 18 of the transfer gear shift means 11 in the position $P_H$ where the transfer gear assembly 3 is shifted into the high speed drive range, or the H drive mode. Although the shift fork 8 is prevented from being displaced beyond the position $P_H$, the shift rod 37 can be displaced in the forward direction beyond the 4W-DL-H drive mode selecting position to the 2W-H drive mode selecting position. Specifically, when the shift rod 37 is urged in the forward direction, the tapered end of the axial groove 37a forces the pin 41 to retract against the spring 47 out of the axial groove 37a, so that the shift rod 37 is allowed to axially move, leaving the shift fork 38 at the position PH. On the other hand, when the shift rod 37 is axially displaced in the rearward direction or to the right as viewed in FIGS. 2 and 4 beyond the 4W-DL-H drive mode selecting position, the shift fork 38 is pushed by the annular connecting ring 48 to the right so as displace the shift sleeve member 18 of the transfer gear shift means 11 to the position $P_L$ from the position $P_H$. As a result of this displacement of the shift sleeve member 18, the transfer gear assembly 3 is shifted into the low speed drive range, or the L drive mode. At this time, since the pin 41 is slidably received within the axial groove 37a, much less thrust force is needed to displace axially the shift rod 37. Apparent from the above description, the transfer gear shift means 11 can be operated with a relatively light force to shift the transfer gear assembly 3 between the high speed range or drive mode and the low speed range or the L drive mode. For positively placing the shift fork 38 in the position $P_H$ or $P_L$, there is a click stop mechanism 52 which is well known in the art and comprises two semi-spherical recesses 38c and 38d formed in the peripheral surface of the rear section of the boss 38a of the shift fork 38 and axially spaced away from each other, a steel ball 54 and a spring 53 for forcing the steel ball 53 received in a blind hole 53a formed in the transfer case housing 7.

Figure 5:
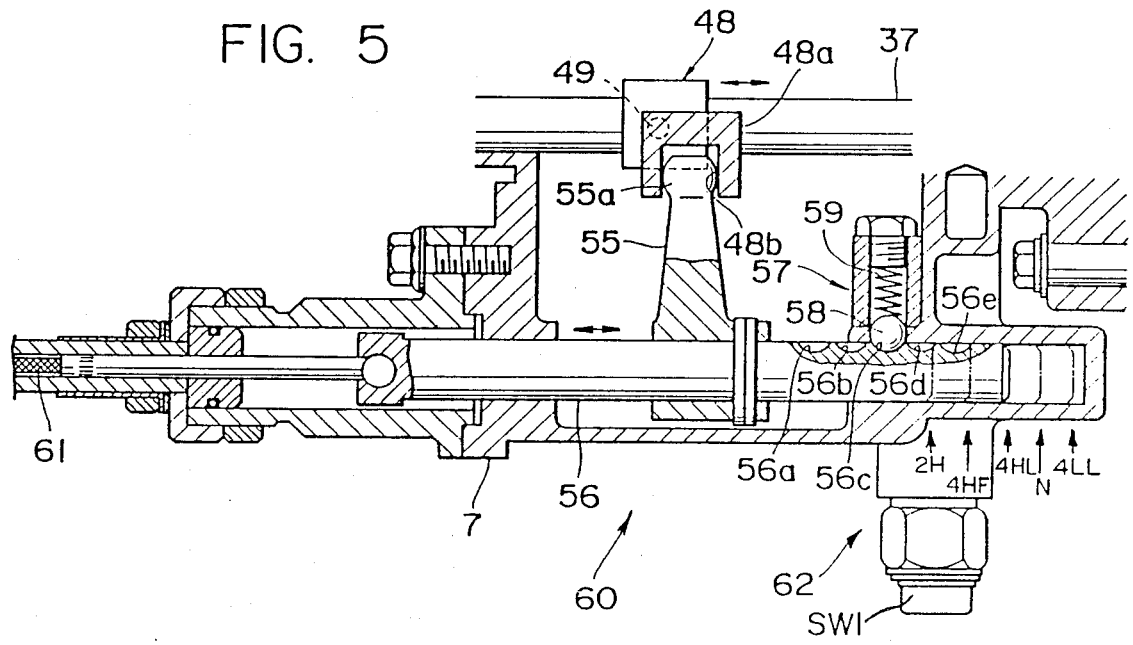
FIG. 5 is a sectional view showing a shift control means associated with the skid shift means of FIG. 4.

For effecting the above-described drive mode shifting of the transfer case T, there is transfer case shift control means 60 shown in detail in FIG. 5. Although, the transfer case shift control means 60 is practically arranged in a plane perpendicularly intersecting the drawing and side by side with respect to the shift mechanism 50, the transfer case shift control means 60 in FIG. 2 is turned through a right angle and illustrated below the skid shift mechanism 50 for easy understanding. As shown in FIG. 5, there is a shift control rod 56 disposed in juxtaposition with the shift rod 37 and supported by the transfer case housing 10 for axial movement to left and right. The shift control rod 56 is provided with a connecting arm 55 fixed thereto. The rounded top end 55a of the connecting arm 55 is received in an engaging recess 48b of a connecting hook 48a which is fixed to the annular connecting ring 48 fixedly mounted on the shift rod 37 of the skid shift mechanism 50. In the outer periphery of the rear end portion of the shift control rod 56, there are formed five substantially semi-spherical recesses 56a to 56e axially arranged at regular intervals. Facing to these recesses 56a to 56e, there is provided in the transfer case housing 10 a click stop mechanism 57 which is well known in the art and comprises a steel ball 58 and a spring 59 forcing the steel ball 58 to enter into one of these recesses 56a through 56e formed in the shift control rod 56. Owing to the provision of the click stop mechanism 57, the control rod 56 is certainly positioned at five different drive mode selecting positions corresponding to the above-described five drive mode selecting positions including the neutral mode selecting position, namely in order from the front, 2W-H drive mode, 4W-DF-H drive mode, 4W-DL-H drive mode, neutral mode and 4W-DL-H drive mode selecting positions.

Figure 6A:
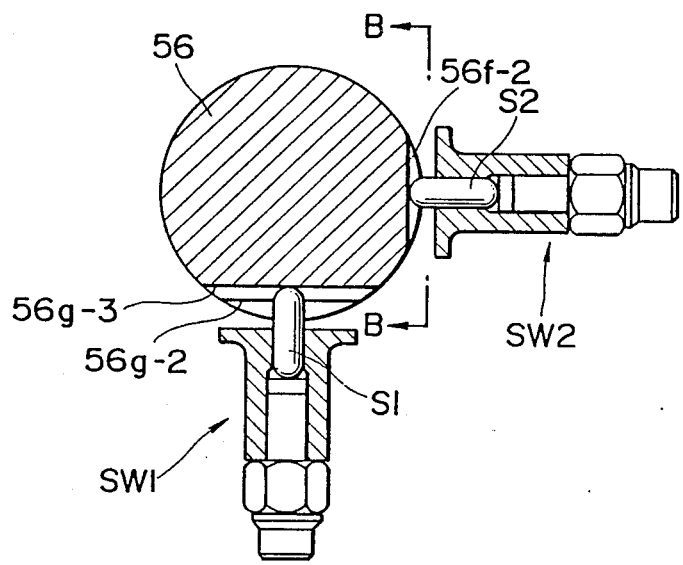
FIGS. 6A and 6B are sectional views showing a position sensor incorporated in the shift control means of FIG. 5.
Figure 6B:
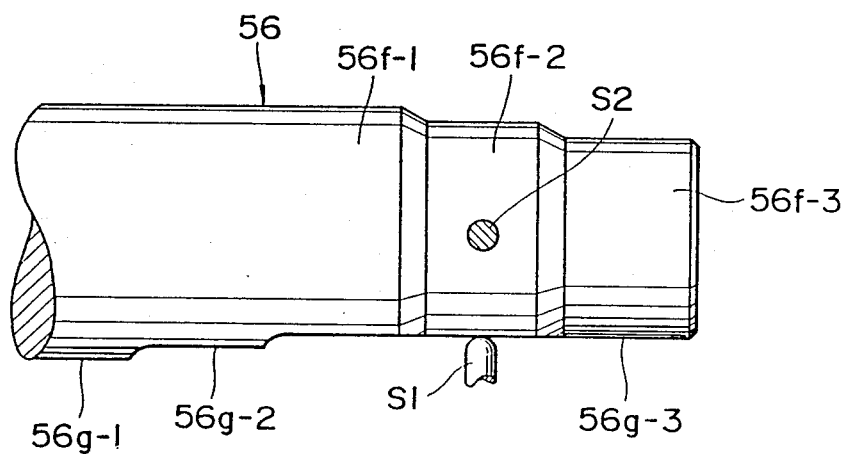

For detecting the shift control rod 56 placed in each drive mode selecting position, there is an axial position sensor 62 comprising a pair of three way limit switches SW1 and SW2 (only one of which is shown in FIG. 5) disposed in the transfer case housing 10 angularly spaced at a right angle around the control rod 56. As is shown in detail in FIGS. 6A and 6B, the shift control rod 56 is formed at its rear end portion with two series of steps 56f-1 to 56f-3 and 56g-1 to 56g-3. One series of steps 56g-1 to 56g-3 can be detected by the switch SW1 and the other series of steps 56f-1 to 56f-3 by the switch SW2. A slide contact S1, S2 of each switch SW1, SW2, is radially displaced by each step 56g, 56f. As a result of the axial movement of the control rod 56, each switch SW1, SW2 provides a position signal corresponding to a selected drive mode selecting position. Specifically, the switch SW1 detects the step 56g-1 to provide a position signal PS-1g when the control rod 56 is placed in the 4LL drive mode selecting position; the step 56g-2 to provide a position signal PS-2g when the control rod 56 is placed in the N drive mode selecting position; and the step 56g-3- to provide a position signal PS-3g when the control rod 56 is placed in the 4HL, 4HF or 2HL drive mode selecting position. In the same way, the switch SW2 detects the step 56f-1 to provide a position signal PS-1f when the control rod 56 is in the 4LL, N or 4HL drive mode selecting position; the step 56f-2 to provide a position signal PS-2f when the control rod 56 is placed in the 4HF mode selecting position; and the step 56f-3 to provide a position signal PS-3g when the control rod 56 is placed in the 2H drive mode selecting position. These position signals are sent to a position control signal generator 67 shown in FIG. 7. This position control signal generator 67 provides the controller 66 with a position signal PS-4L; PS-4F; or PS-2H when receiving position signals PS-1f and PS-1g or PS-1f and PS-3g; PS-2f and PS-3g; or PS-3f and PS-3g, respectively from the switches SW1 and SW2.

Figure 7:
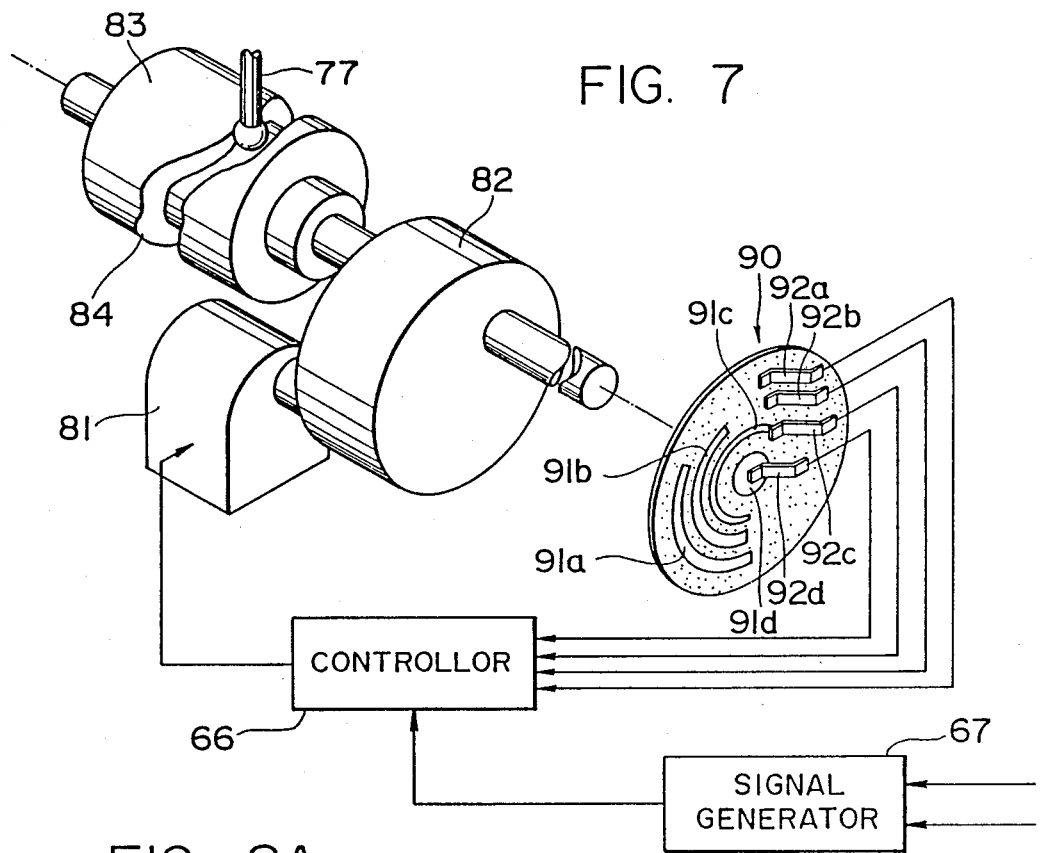
FIG. 7 is an explanatory perspective view showing a mode sensor provided in association with the differential gear shift means of FIG. 2.

Referring again to FIG. 2, for shifting the transfer case T, in particular the center-differential gear assembly 4 between 2W and 4W drive modes and/or DF and DL drive modes through the center-differential gear shift means 33, the controller 66 is used to control the drive motor 81 with its associated reduction gear 82 which is operationally coupled to the shift control rod 83 supported by the transfer case housing 10 for rotation and having a cam groove 84. Disposed in juxtaposition with the shift control rod 83 is a guide rod 86 to which a sleeve member 76 is fixedly mounted. The sleeve member 76 is provided with a connecting pin 77 by which the cam groove 84 of the shift control rod 83 is slidably engaged and with a shift fork 78, the connecting pin 77 and shift fork 78 being axially spaced from and extending radially oppositely to each other. The shift fork 78 is in slidable engagement with an annular groove 28b formed on the outer periphery of the shift sleeve member 28 of the differential gear shift means 33. As is shown in FIG. 7, the shift control rod 83 is provided with a mode sensor 90 comprising a printed contact disc 91 having arcuate contacts 91a to 91d printed thereon and fixed contacts 92a to 92d provided one individual to each arcuate contact to provide mode signals PS corresponding to selected drive modes. The contacts 91d and 92d are used as common contacts for the other three. Specifically, when the drive motor 81 is rotated to turn the shift control rod 83 through an angle necessary to axially displace the guide rod 86 so as to place the shift sleeve member 28 of the differential gear shift means 33 to the position $P_2$ in order to shift the center-differential gear assembly 4 into the 2W drive mode, the printed contact 91c of the contact disc 91 is brought into contact with the fixed contact 92c to provide a mode signal PS-2H. In the same way, the drive motor 81 is rotated to turn the control rod 83 so as to place the shift sleeve member 33 to the position $P_{4L}$ in order to shift the center-differential gear assembly 4 into the 4W-DL drive mode, the printed contact 91b of the contact disc 91 is brought into contact with the fixed contact 92b to provide a mode signal PS-4L, and so as to place the shift sleeve member 33 to the position $P_{4F}$ in order to shift the center-differential gear assembly 4 into the 4W-DF drive mode, the printed contact 91a of the contact disc 91 is brought into contact with the fixed contact 92a to provide a mode signal PS-4F. These position signals are sent to the controller 66.

Figure 8A:
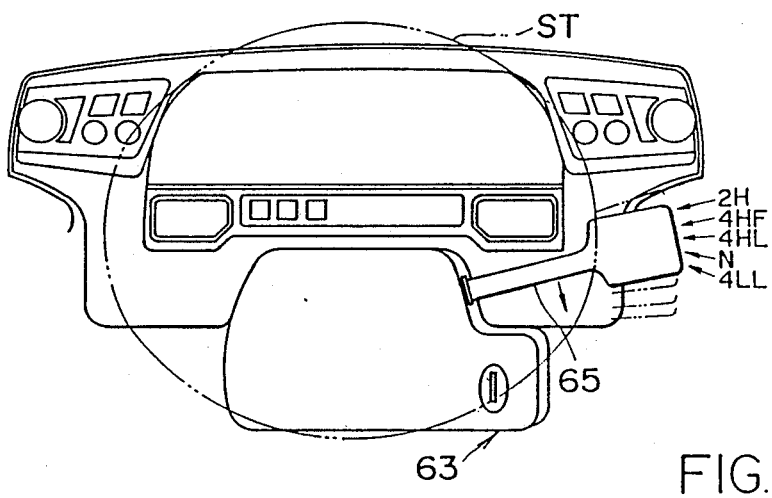
FIG. 8A is an illustration showing a drive mode selecting device in a driver's compartment of a vehicle.
Figure 8B:
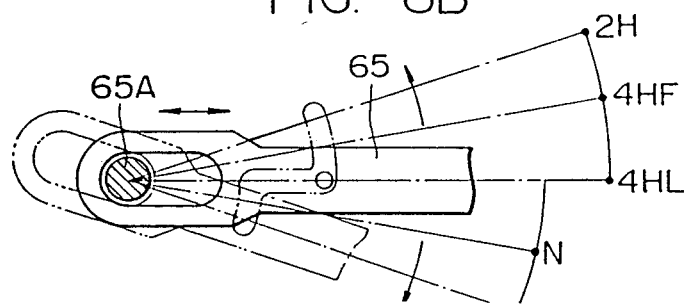
FIG. 8B is an explanatory view showing a drive mode selecting lever of FIG. 8A.

For actually effecting the above-described drive mode shifting of the transfer case T, there is drive mode selecting means 63 with a drive mode selecting lever 65 such as a column shift lever operated by the driver in the driver's compartment. As is shown in FIGS. 8A and 8B, the drive mode selecting means 63 includes the drive mode selecting lever 65 rotatably mounted on a steering column 65A mounting a steering wheel ST. The drive mode selecting lever 65 is shiftable between five selecting positions, namely in order from the top, 2W-H drive mode, 4W-DFH drive mode, 4W-DL-H drive mode, neutral mode and 4W-DL-L drive mode selecting positions, to select a desired drive mode of operation of the transfer case T. It is noted in this embodiment that, when being shifted between the 4W-DL-H drive mode and neutral mode selecting positions, the drive mode selecting lever 65 is radially pushed or pulled as is shown in FIG. 8B. Corresponding to the shifting of the drive mode selecting lever 65, the shift control rod 56 of the transfer case shift control means 60 is selectively placed in the drive mode selecting positions through the push-pull type cable 61. Owing to the provision of the position sensor 62, each drive mode selected by the drive mode selecting lever 65 can be electrically detected and can be detected according to an axial position of the shift control rod 56. When the drive mode selecting lever 65 is manipulated and the axial position sensor 62 provides the position control signal PS-2H, PS-4F or PS-4L, the controller 66 causes the motor 81 to shift the transfer case T, in particular the center-differential gear assembly 4. As the result of transition of the center-differential gear assembly 4, the controller 66 receives the mode signal PS-2H, PS-4F or PS-4L from the mode sensor 90 so as to stop the motor 81.

According to operated positions of the drive mode selecting lever 65, the various elements of the transfer case T are positioned as follows:

| Lever (65) Position | Transfer Shift Means (11) | Differential Shift Means (33) | Drive Mode | Center Diff (4) |
|---|---|---|---|---|
| 2H | $P_H$ | $P_2$ | 2W | Free |
| 4HF | $P_H$ | $P_{4F}$ | 4W | Free |
| 4HL | $P_H$ | $P_{4L}$ | 4W | Locked |

| Lever (65) Position | Transfer Shift Means (11) | Differential Shift Means (33) | Drive Mode | Center Diff (4) |
|---|---|---|---|---|
| 4LL | $P_L$ | $P_{4L}$ | 4W | Locked |

Figure 4:
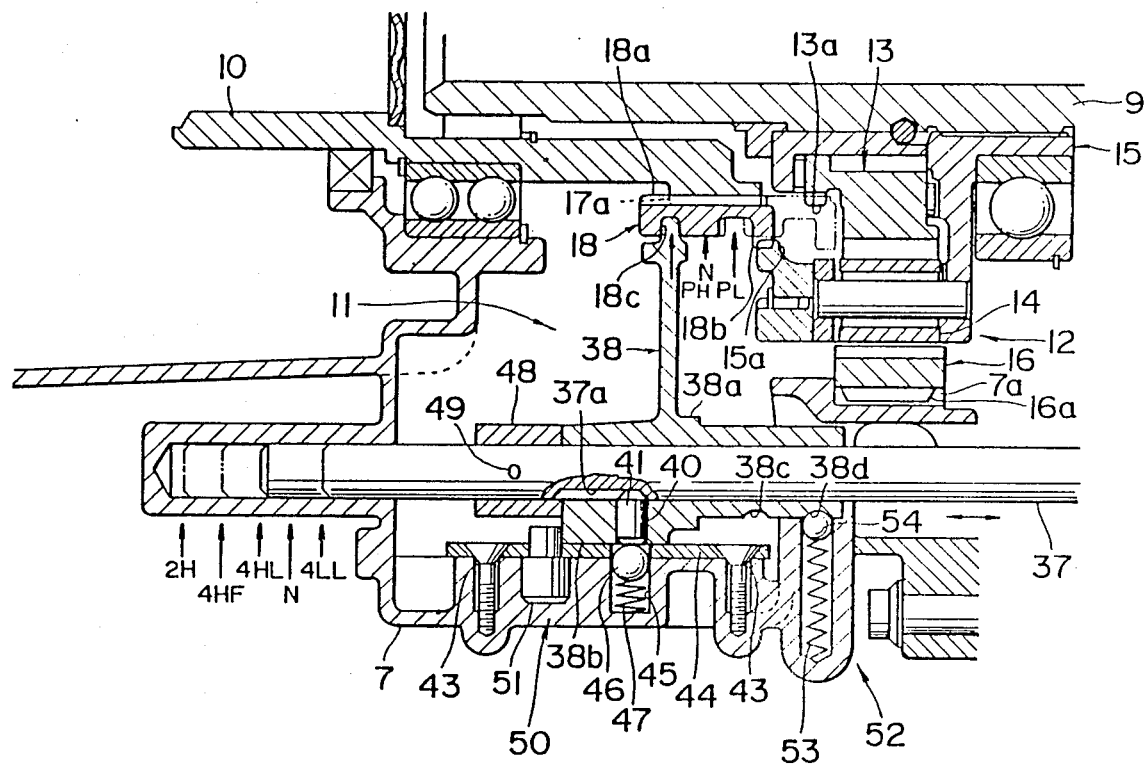
FIG. 4 is a sectional view showing a skid shift means associated with the transfer gear shift means of the transfer case of FIG. 2.

In operation of the transfer shift device of the preferred embodiment according to the present invention constructed as described above, the drive mode selecting lever 65 is manipulated by the driver in the driver's compartment to shift the transfer case T into a desired drive mode. All the elements of the transfer case T are positioned as is shown in FIGS. 2, 4 and 5 when the transfer case is in the 4W-DL-H drive mode.

When the drive mode selecting lever 65 is manually operated and moved to the 2W-H drive mode selecting position from the 4W-DL-H drive mode selecting position, the control rod 56 is displaced axially in a direction to the front or left side as viewed in FIG. 2 to force the shift rod 37 to move axially in the same direction. The boss 38a of the shift fork 83 is, as is shown in FIG. 4, prevented from moving axially in the forward direction by the restriction stud 51, no shifting operation is caused in the transfer gear shift means 11 so as to maintain the transfer gear assembly 3 in the high speed drive range, namely the H drive mode. On the other hand, the position sensor 62, in particular the three way limit switches WS1 and WS2, detects the steps 56g-3 and 56f-3, respectively to provide the controller 66 with the position control signal PS-2H through the position control signal generator 67. By the presence of the position signal PS-2H, the controller 66 causes the electric motor 81 to rotate so as to turn the shift control rod 83 through the reduction gear 82 until the mode sensor 90 provides a mode signal PS-2H. As a result, the guide rod 86 is axially displaced to the rear or right side as viewed in FIG. 2 through the sliding engagement between the can groove 84 of the control rod 83 and the connecting pin 77 of the guide rod 86 to place the shift sleeve member 28 of the differential gear shift means 33 in the position $P_2$. As is previously described, when the shift control rod 83 turns through an angle necessary to place the shift sleeve member 28 in the position $P_2$, the mode sensor 90 provides the controller 66 with an mode signal PS-2H. By the presence of the mode signal PS-2H, the controller 66 stops the motor 81. In such a way, the center-differential gear assembly 4 is shifted in the 2W drive mode from the W-DL drive mode while the transfer gear assembly 3 is maintained in the high speed range (H), namely, the transfer case T is shifted in the 2W-H drive mode.

When the drive mode selecting lever 65 is manipulated to select the 4W-DF-H drive mode, the control rod 56 is axially displaced to the position 4HF drive mode selecting position either from the 4HL drive mode selecting position or from the 2H drive mode selecting position, forcing the shift rod 37 to move axially to the 4HF drive mode selecting position. Although the shift rod 37 is axially displaced in any direction toward the 4HF drive mode selecting position, the boss 38a of the shift fork 38 of the transfer gear shifting means 11 stays at the same position without shifting the shift sleeve member 18 from the position $P_H$ to either the position N or the position $P_L$, the transfer gear assembly 3 is maintained in the high speed drive range (H drive mode). On the other hand, when the control rod 56 is axially displaced and placed in the 4HF drive mode selecting position, the position sensor 62, namely the three way limit switches SW1 and SW2, detects the steps 56g-1 and 56f-2, respectively, to provide the controller 66 with the position control signal PS-4F through the signal generating circuit 67. Consequently, the controller 66 causes the motor 81 to rotate so as to turn the shift control rod 83 through the reduction gear 82, axially displacing the guide rod 86 through the sliding engagement between the cam groove 84 and the connecting pin 77 to move the shift sleeve member 28 of the differential shift means 33 toward the position $P_{4F}$. When the shift control rod 83 turns through an angle necessary to place the shift sleeve member 28 in the position $P_{4F}$, the mode sensor 90 provides the controller 66 with a mode signal PS-4F so as to stop the electric motor 81. In such a way, the center-differential gear assembly 4 is shifted in the 4W-DF drive mode while the transfer gear assembly 3 is maintained in the high speed drive range (H), so as to shift the transfer case T in the 4W-DF-H drive mode.

As is apparent from the above description, when the drive mode selecting lever 65 is manually manipulated by the driver between the three selecting positions, namely the 2W-H, 4W-DF-H and 4W-DL-H drive mode selecting positions, the transfer gear shift means 11 is never actuated, so that the transfer gear assembly 3 in the high speed drive range (H) is maintained in the same drive range (H drive mode) by means of the skid shifting mechanism 50 while the shift rod 37 is axially displaced to cause the motor 81 to turn in order to shift the differential gear assembly 4.

On the other hand, when it is desired to shift the transfer case T into the 4W-DL-L drive mode, the vehicle is stopped and the engine clutch is disengaged to disconnect driving power from the engine 1 to the transmission 2 prior to the manipulation of the drive mode selecting lever 65. Thereafter, the drive mode selecting lever 65 is pushed radially inwardly and then pulled downwardly to select the 4W-DL-L drive mode. This manipulation of the drive mode selecting lever 65 causes the axial movement of the control rod 56 to the rear or right side as viewed in FIGS. 2 and 4 toward the 4W-DL-L drive mode selecting position thereof. Through the engagement of the annular connecting ring 48a fixed to the connecting sleeve 48 of the shift rod 37 and the connecting pin 55 of the shift control rod 56, the shift rod 37 is axially displaced in the same direction as the control rod 56. Because of the connecting sleeve 48 fixed to the shift rod 37, the shift fork 38 is forced by the connecting sleeve 48 to move axially to the right side, shifting the shift sleeve member 18 of the transfer gear shift means 11 to the position $P_L$ passing the neutral position N so as to shift the transfer gear assembly 3 into the low speed drive range (L drive mode). Simultaneously with the transition of the transfer gear assembly 3, the switches SW1 and SW2 of the axial position sensor 62 detect the steps 56g-1 and 56f-1 to provide the controller 66 with a position signal PS-4L through the position control signal generating 67. The controller 66, upon receiving the position signal PS-4L through the control signal generating 67, causes the electric motor 81 to rotate so as to turn the shift control rod 83, axially displacing the guide rod 86 through the sliding engagement between the cam groove 84 of the shift control rod 83 and the connecting pin 77 of the guide rod 86. As a result, the shift sleeve member 28 engaged by the shift fork 78 is displaced toward the position $P_{4L}$. At the moment the shift sleeve member 28 is placed in position, the mode sensor 90 provides the controller 66 with the mode signal PS-4L. Responding to the provision of the mode signal PS-4L, the controller 66 stops the motor 81 to complete the transition of the center-differential gear assembly 4 to the 4W-DL drive mode, and hence the transition of the transfer case T to the 4W-DL-L drive mode.

As is apparent from the above description, when the transfer gear assembly 3 is shifted between the high and low speed drive range H and L, the transfer gear shift means 11 is mechanically connected to the drive mode selecting lever 65 through the cable 61, the shift control rod 56 and the shift rod 37 with the skid shift means 50 and operated directly by the driver. Owing to this mechanical and direct operation, the transition of the transfer gear assembly 3 is taken certainly and smoothly even though a large force is required to shift the transfer gear shift means 11.

Referring now to FIGS. 9 through 11A and 11B, there is shown another preferred embodiment of the present invention. The transfer case T with its associated first and second shift means in this embodiment are the same in construction and operation as those in the previous embodiment but is operated in a different way. In this embodiment, skid shift means 150 and transfer case shift control means 160 are almost the same in construction and function as those of the previous embodiment but has only three operating positions, namely 2W-H, 4W-DL-H and 4W-DL-L drive mode selecting positions (which are indicated by 2H, 4HL and 4LL, respectively in FIGS. 9 10 and 11A). Therefore, the same or similar elements and interconnecting mechanisms, which are indicated by the same reference numerals, are not needed to be described here.

Figure 9:
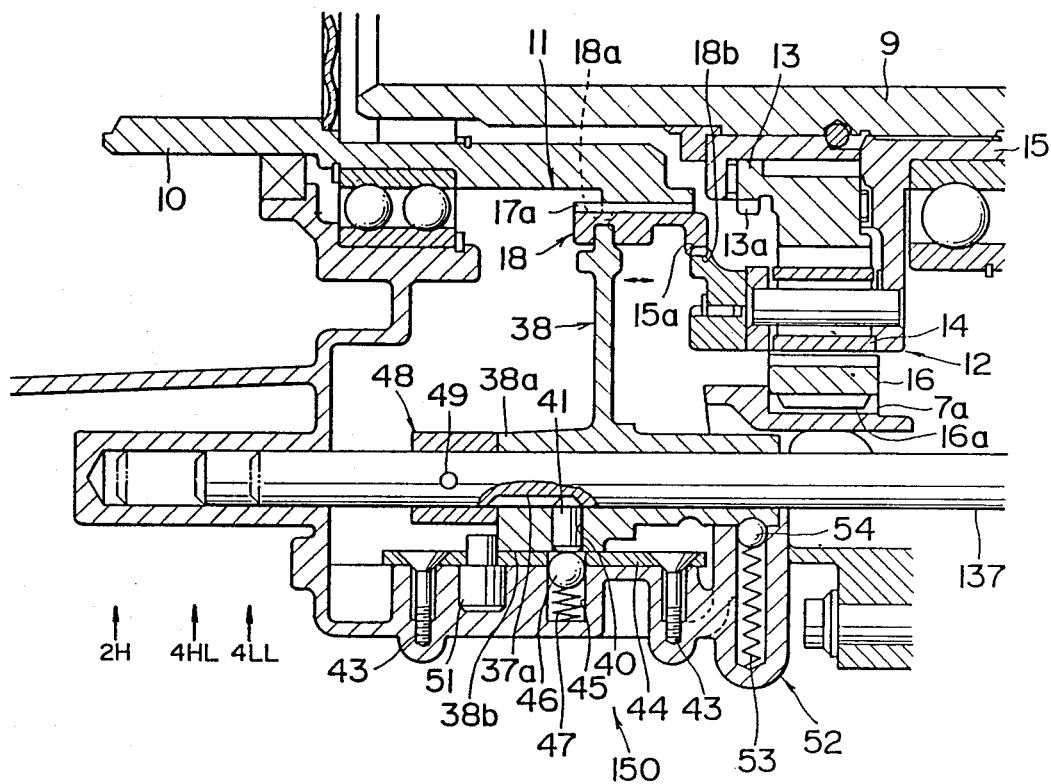
FIG. 9 is a sectional view showing a skid shift means, similar to FIG. 4 but different in drive mode selecting positions, associated with the transfer gear shift means of FIG. 2.

As is shown in FIG. 9, the skid shift means 150 has a shift rod 137 axially movable and positioned at three positions; 2H, 4HL and 4LL drive mode selecting positions. In the same way as in the previously described embodiment, the shift rod 137 places the shift sleeve member 18 of the transfer gear shift means 11 in the position $P_H$ or in the position $P_L$.

Figure 10:
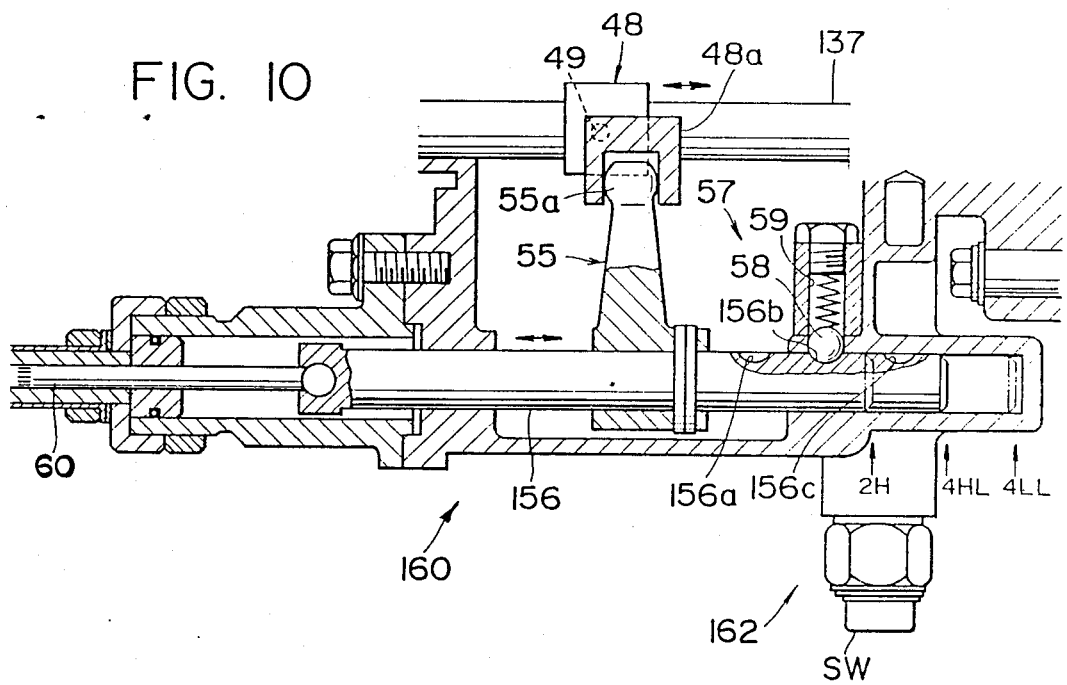
FIG. 10 is a sectional view showing a shift control means, similar to FIG. 5, associated with the skid shift means of FIG. 9.

The transfer case shift control means 160, as is shown in FIG. 10, has an axially movable shift rod 156 which is operationally connected to drive mode selecting means 163 which will be described in detail later and is axially movable between three positions; 2W-H, 4W-DL-H and 4W-DL-L drive mode selecting positions in order from the front. A click stop mechanism 157 is provided in association with the axially movable shift rod 156 which has the same function as the previous click stop mechanism 57 but has only three stop position. For detecting the shift rod 156 at its shifted position, there is a position sensor 162 which a position signal PS which in turn is sent to the controller 66 through the position control signal generator 67.

Figure 11A:
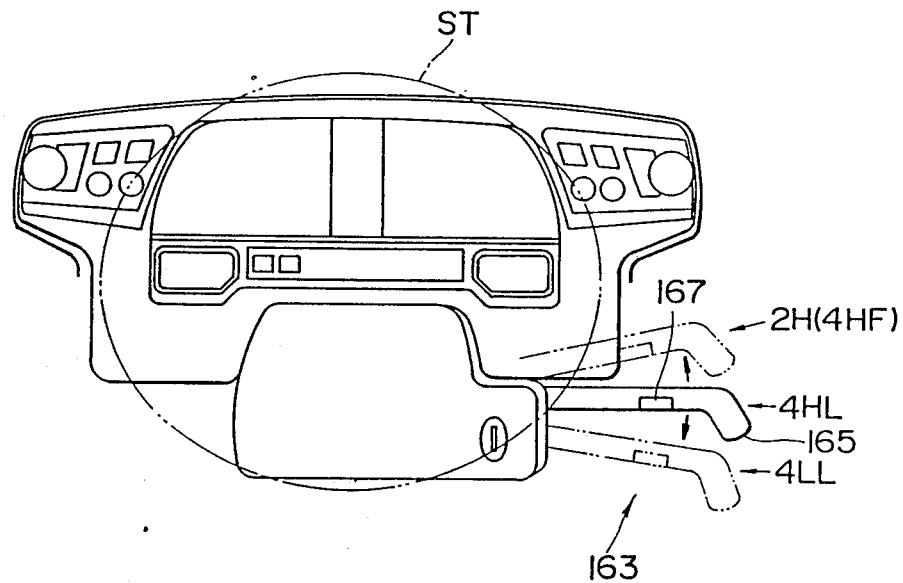
FIG. 11A is an illustration showing a drive mode selecting device similar to FIG. 8A but different in drive mode selecting position.
Figure 11B:
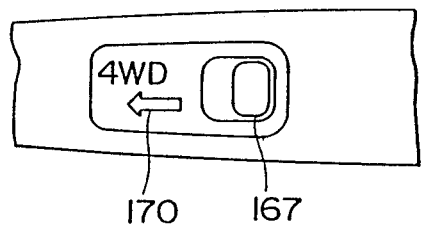
FIG. 11B is an illustration showing a detail of the drive mode selecting lever of FIG. 11A.

Referring to FIGS. 11A and 11B, the drive mode selecting means 163, which comprises a drive mode selecting lever 165 operationally connected to the shift rod 156 of the transfer case shift control means 160 by means of the push-pull type cable 61, is mounted on the steering column to turn up and down between three drive mode selecting positions corresponding to the drive mode selecting positions of the shift rod 156. This column shift lever 167 is provided with a 2W-4W shift switch 167 of the type of a slidable dip-switch which is normally urged to a position shown in FIG. 11B and is slidably moved toward a drive mode selecting position as is indicated by an arrow 170. The 2W-4W shift switch 170 is adapted to be electrically enabled only when the drive mode selecting lever 165 is in the 2H drive mode selecting position and to provide a mode shift control signal; namely a 4W shift signal when it is firstly moved to the drive mode selecting position and a 2W shift signal when moved again to the drive mode selecting position, each shift being sent to the controller 66. When the 2W-4W shift switch is firstly operated to provide the 4W shift signal is provided, the controller 66 controls the motor 81 to turn to place the shift sleeve member 28 now in the position $P_2$ to the position $P_{4F}$ so as to shift the center-differential gear assembly 4 into 4W-DF drive mode and, when a 2W shift signal is provided, the controller 66 controls the motor 81 to turn in the reversed direction to return the shift sleeve member 28 to the position $P_2$ so as to shift again the center-differential gear assembly 4 into the 2W drive mode. In this embodiment, it is permissible to separately provide a push-on push-off type switch in association with said motor 81 through said controller 66 for effecting the shift of the center-differential between the differential-locked and differential-free drive modes in place of providing the drive mode selecting position to which the drive mode selecting lever 165 is turned to select the differential-free drive mode of operation of the center-differential. Such a push switch is conveniently provided on, for example, the top of a gear stick extending from a floor of the vehicle for changing transmission gears. Owing to the provision of the push switch, a quick and easy operation of shifting the center-differential between the differential-locked and differential-free drive mode of operation is effected.

When the drive mode selecting lever 165 is operated to be placed in the 2W-H drive mode selecting position (2H) to select the 2W-H drive mode of operation of the transfer case T, the shift control rod 156 is axially displaced to the 2H drive mode selecting position. The position sensor 162 including the switch SW detects the shift control rod 156 to provide a 2H position signal as a control signal which is sent to the controller 66. When the controller 66 receives the control signal to allow the provision of the 4W shift signal from the 2W-4W shift switch 167. At this time, the skid shift means 150 acts in the same way as the skid shift means 50 in the previous embodiment so as to maintain the transfer gear shift means 11 in the position $P_H$, thereby to maintain the transfer gear assembly 3 shifted in the H drive mode while to allow the shift rod 137 to axially move to the 2H drive mode selecting position from the 4HL drive mode selecting position. Therefore, as long as the 2W-4W shift switch 167 is not operated to slide to the drive mode selecting position, the transfer case T is maintained in the 2W-H drive mode.

On the other hand, when the 2W-4W- shift switch 167 is operated to select the 4W drive mode, the controller 66 receives signals from the position sensor 162 and the 2W-4W shift switch 168, causing the motor 81 to turn so as to place the shift sleeve member 28 of the differential gear shift means 33 in the position $P_{4F}$, thereby to shift the center-differential gear assembly 4 into the 4W-DF drive mode, and hence the transfer case T into the 4W-DF-H drive mode. If the 2W-4W shift switch 167 is operated again, the center-differential gear assembly 4 is returned to the 2W-DF drive mode. When the dive mode selecting lever 165 is operated and placed in the 4HL drive mode selecting position, the shift control rod 156 is axially displaced to the 4W-DL-H drive mode selecting position 4HL as is shown in FIG. 10 from the position 2H. As a result of this axial displacement of the shift control rod 156, the position sensor 162 provides a position signal which is sent to the controller 66 to control the motor 81 to turn so as to displace the shift sleeve member 28 to the 4W-DL drive mode selecting position, thereby to shift the center-differential gear assembly 4 into the 4W-DL drive mode while the shift sleeve member 18 is maintained in the position $P_H$ so as to maintain the transfer gear assembly 3 in the H drive mode. As a result, the transfer case T is shifted into the 4W-DL-H drive mode. After this transition of the transfer case T, even if the 2W-4W shift switch 167 is operated, no transition is caused in the center-differential gear assembly 4 since the 2W-4W shift switch 167 is electrically disabled.

When the drive mode selecting lever 165 is operated and placed in the 4W-DL-L drive mode selecting position (4LL), the shift control rod 156 is axially displaced to the 4W-DL-L drive mode selecting position $4_{LL}$ from the position $4_{HL}$. Following to this axial movement of the shift control rod 156, the shift rod 37 is displaced to push the shift fork 38 in the same direction so as to displace the shift sleeve member 18 to the position $P_L$, shifting the differential gear assembly 3 into the L drive mode. As a result, the transfer case T is shifted into the 4W-DL-L drive mode. In this embodiment, the mode sensor 90 provides a mode signal for stopping the motor 81 at the position $P_2$, $P_{4L}$ or $P_{4F}$ through the controller 66 in the just same manner as in the previous embodiment.

Figure 12:
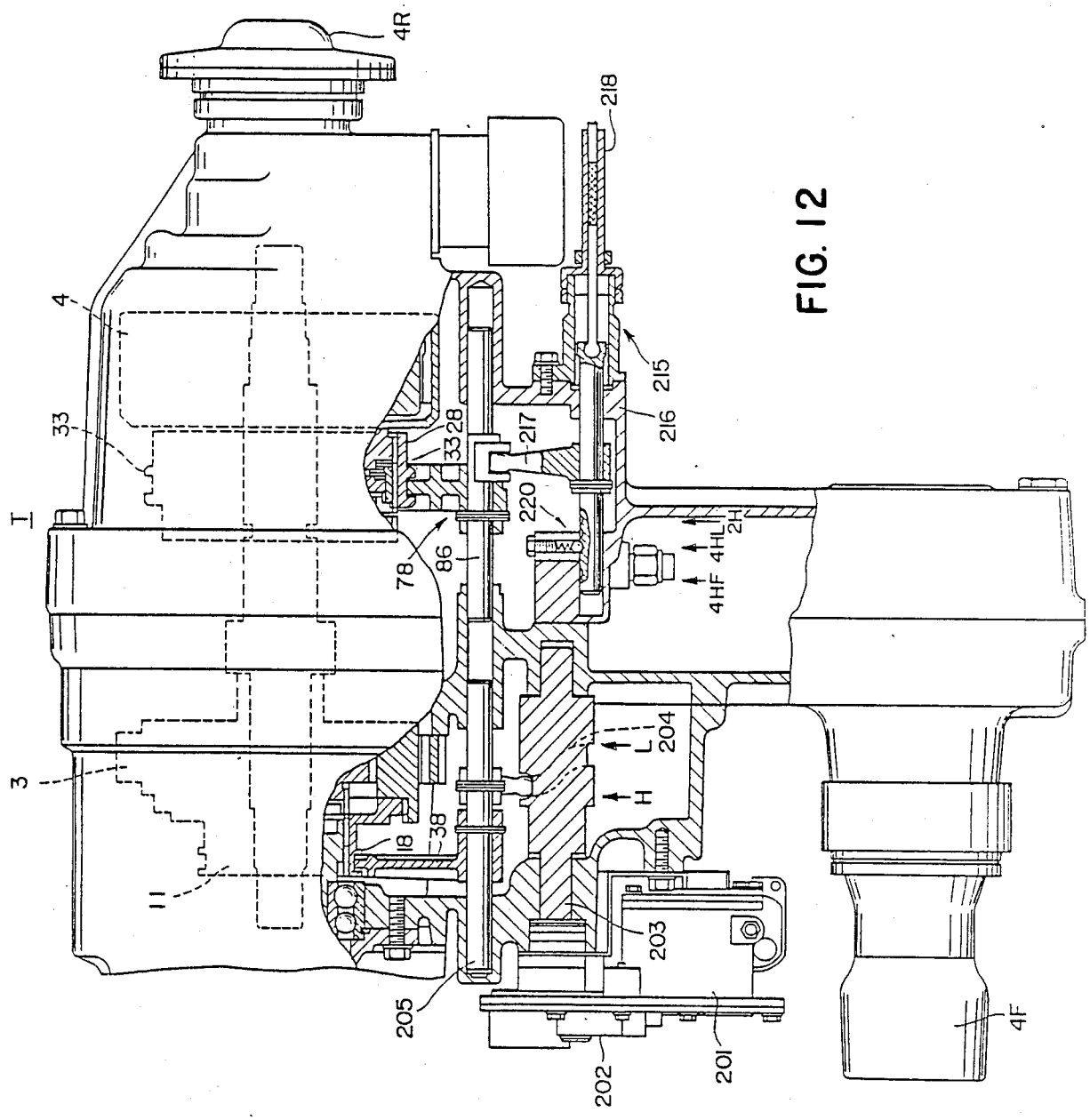
FIG. 12 is a partly sectional view showing details of another embodiment of the transfer case according to the present invention.

Referring now to FIG. 12 shown therein is another embodiment of the invention. In this embodiment, the differential case T comprises the transfer gear assembly 3 and the center-differential gear assembly 4, with their associated gear shift means 11 and 33, of which construction and function is just the same as that of the above described embodiments, so that a detail description is omitted as to these gear assemblies 3 and 4, with their associated gear shift means 11 and 33 for the purpose of avoiding repetition. The transfer gear shift means 11 of the assembly 3 of this embodiment is operationally coupled to a reversible electric motor 201 with a reduction gear 202 through the controller 66 and shift control rod 203 with a control cam groove 204 so as to shift a shift rod 205 to which the shift fork 38 of the transfer gear shift means 11 is fixed. The shift control rod 205 is connected to mode sensor 210 which detects a drive mode of operation of the transfer gear assembly 3 through an angular position of the shift control rod 205 to provide a mode signal. By rotating the motor 201 in one direction the sleeve shift member 18 of the transfer gear shift means 11 is shifted to a position $P_L$ from a position $P_H$ shown in FIG. 12 so as to shift the transfer gear assembly 3 into the L drive mode. When the transfer gear assembly 3 is completely shifted into the L drive mode, the mode sensor 210 provides a mode signal which is sent to the controller to stop the motor 201. In such a way, the transition of the transfer gear assembly 3 to the L drive mode is completed. In the same way, but by rotating the motor 201 in the opposite direction, the transfer gear assembly 3 is shifted into the H drive mode.

The center-differential gear assembly 4 is mechanically coupled to a shift control means 215 having the same construction and function as that of the embodiment shown in FIG. 10. Through a connecting arm 217 fixed to the shift control rod 216 which is slidably moved in its axial direction, this shift control means 215 is connected to the guide rod 86 to which the fork member 78 of the differential gear shift means 33 is fixed. The shift control rod 216 is operationally coupled to a drive mode selecting lever such as a well-known column shift lever disposed in the driver's compartment of the vehicle through a push-pull type cable 218. At the rear end of the shift control rod 216, there is a click stop mechanism 220 well known in the art for positively position the shift control rod 216 at three drive mode selecting positions, namely in order from the left in FIG. 12, 4W-DF-H drive mode selecting position 4HF, 4W-DL-H drive mode selecting position 4HL and 2W drive mode selecting position 2H.

By shifting the shift control rod 216 by an operation of the drive mode selecting lever in the driver's compartment, the center-differential gear assembly can be shifted into a desired drive mode operation: 2W-DF-H drive mode, 4W-DL-H drive mode or 2W-H drive mode.

Although the present invention has been fully described by way of the preferred embodiments thereof with reference to the accompanying drawings, it is to be noted that various changes and modifications are apparent to those skilled in the art. Therefore, unless otherwise such changes and modifications depart from the true scope of the present invention, they should be construed as included therein.

What is claimed is:

1. A transfer case operating apparatus for shifting a drive mode of operation of a transfer case used in a four-wheel drive vehicle, said transfer case having a transfer gear assembly shiftable between a high-speed and a low-speed drive gear assembly shiftable between a high-speed and a low-speed drive mode of operation and a center-differential gear assembly shiftable between at least two drive modes of operations, said apparatus comprising:

first shift means for shifting said transfer gear assembly between said high and low speed drive modes of operation;

second shift means for shifting said center-differential gear assembly between said at least two drive modes of operation;

drive mode selecting means operated by a driver in a driver's compartment of said vehicle for selecting a desired drive mode of operation of said transfer case; and shift control means operationally connected to and placed in different positions by said drive mode selecting means for selecting one shift means of said first and second shift means through mechanically actuating means directly connected therewith and selecting the other shift means of said first and second shift means through electric actuating means to shift said transfer case into a desired drive mode of operation selected through said drive mode selecting means, said mechanical actuating means being able to operationally disconnect said shift control means and said one shift means when said shift control means selects said other shift means.

2. An apparatus as defined in claim 2, wherein said shift control means has a position sensor for detecting at least positions between which said shift control means is shifted to cause said other shift means to provide a control signal for controlling said electric actuating means.

3. An apparatus as defined in claim 2, wherein said one and said other shift means are associated with said first and said second shift means, respectively.

4. An apparatus as defined in claim 3, wherein said center-differential gear assembly is shiftable between a two-wheel and a four-wheel drive mode of operation.

5. An apparatus as defined in claim 4, wherein said center-differential gear assembly is further shiftable between a differential-locked and a differential-free drive mode of operation.

6. An apparatus as defined in claim 3, wherein said center-differential gear assembly is shiftable between a differential-locked and a differential-free drive mode of operation.

7. An apparatus as defined in claim 3, wherein said drive mode selecting means has two-wheel; four-wheel, differential-locked and high-speed; and four-wheel, differential-locked and low-speed drive mode selecting positions.

8. An apparatus as defined in claim 7, wherein said drive mode selecting means further has a four-wheel, differential-free and high-speed drive mode selecting position.

9. An apparatus as defined in claim 3, wherein said drive mode selecting means has an electric switch for selecting a four-wheel, differential-free and high-speed drive mode operation of said transfer case.

10. An apparatus as defined in claim 9, wherein said electric switch is functionally disabled when said shift lever is placed other than in said two-wheel drive mode selecting position.

11. A transfer case operating apparatus for shifting a drive mode of operation of a transfer case used in a four-wheel drive vehicle, said transfer case having a transfer gear assembly shiftable between a high- and a low-speed drive mode of operation and a center-differential gear assembly shiftable between at least two different drive modes of operation, said apparatus comprising:
   mechanical shift means for shifting said transfer gear assembly between said high-speed and said low-speed drive modes of operation;
   power drive shift means having an electric motor for shifting said center-differential gear assembly between said at least two drive modes of operation;
   shift control means mechanically connected to said mechanical shift means for causing said mechanical shift means to shift said transfer gear assembly and said electric motor of said power drive shift means to shift said center-differential assembly, thereby to shift said transfer case into a desired mode of operation;
   means for disconnecting said mechanical shift means from said shift control means when said center-differential gear assembly is shifted; and
   drive mode selecting means operationally coupled to said shift control means and operated by a driver in a driver's compartment to select a desired drive mode of operation of said transfer case.

12. A transfer case operating apparatus for shifting a drive mode of operation of a transfer case used in a four-wheel drive vehicle, said transfer case having a transfer gear assembly shiftable between a high-speed and a low-speed drive mode of operation and a center-differential gear assembly shiftable between a two-wheel and a four-wheel drive mode of operation and between differential-locked and differential-free drive modes of operation, said apparatus comprising:
   power drive shift means for shifting said transfer gear assembly between said high-speed and said low speed drive modes of operation;
   mechanical shift means for shifting said center-differential gear assembly between a two-wheel, a four-wheel differential locked, and a four-wheel center-differential-free drive mode of operation; and
   operation means including a shift switch for actuating said power drive shift means and a shift lever for shifting said mechanical shift means, so as to selectively shift said transfer case into a desired drive mode of operation.

13. A transfer case operating apparatus as defined in claim 12, wherein said mechanical shift means can shift said center-differential gear assembly between said two-wheel and said four-wheel drive modes of operation.

14. A transfer case operating apparatus for shifting a drive mode of operation of a transfer case used in a four-wheel drive vehicle, said transfer case having a transfer gear assembly shiftable between a high-speed and a low-speed drive mode of operation and a center-differential gear assembly shiftable between at least two drive modes of operations, said apparatus comprising:
   first shift means for shifting said transfer gear assembly between said high and low speed drive modes of operation;
   second shift means for shifting said center-differential gear assembly between said at least two drive modes of operation;
   drive mode selecting means operated by a driver in a driver's compartment of said vehicle for selecting a desired drive mode of operation of said transfer case with different operating forces between when operated to shift said first shift means and when operated to shift said second shift means; and
   shift control means operationally connected to and placed in different positions by said drive mode selecting means for selecting one shift means of said first and second shift means through mechanically actuating means directly connected therewith and selecting the other shift means of said first and second shift means through electric actuating means to shift said transfer case into a desired drive mode of operation selected through said drive mode selecting means.

* * * * *